United States Patent [19]

Nishikawa et al.

[11] Patent Number: 5,965,653
[45] Date of Patent: Oct. 12, 1999

[54] POLYETHYLENE TEREPHTHALATE RESIN COMPOSITION, MOLDED PRODUCT AND RESIN MODIFYING METHOD

[75] Inventors: Masataka Nishikawa; Akihiko Hayashi, both of Osaka, Japan

[73] Assignee: Orient Chemical Industries, Ltd., Osaka, Japan

[21] Appl. No.: 09/137,475

[22] Filed: Aug. 20, 1998

Related U.S. Application Data

[63] Continuation-in-part of application No. 09/027,364, Feb. 20, 1998.

[30] Foreign Application Priority Data

Feb. 26, 1997 [JP] Japan ................................. 9-59771

[51] Int. Cl.⁶ ............................................. C08K 3/00
[52] U.S. Cl. ............................ 524/424; 524/401; 524/442
[58] Field of Search .................................... 524/401, 424, 524/442

[56] References Cited

U.S. PATENT DOCUMENTS 4,352,907 10/1982 Lee .......................................... 524/537
5,374,675 12/1994 Plachetta et al. ........................ 524/403

Primary Examiner—Samuel A. Acquah
Attorney, Agent, or Firm—McGlew and Tuttle, P.C.

[57] ABSTRACT

Polyethylene terephthalate resin composition comprising a polyethylene terephthalate resin and nigrosine, optionally containing fibrous reinforcing material, e.g. in an amount of about 10 to 120% by weight relative to the polyethylene terephthalate resin. The polyethylene terephthalate resin composition enables the production of molded products good in appearance, surface gloss, mechanical characteristics and light fastness. The composition has a crystallization rate upon molding which is lower than that of a corresponding natural polyethylene terephthalate resin containing no coloring agents and which is also lower than that of a corresponding polyethylene terephthalate resin composition comprising a polyethylene terephthalate resin and carbon black. The composition is capable of forming a molded product that can elongate more than 200% and also more than two times relative to a corresponding natural polyethylene terephthalate resin containing no coloring agents.

32 Claims, No Drawings ized bodies (mechanical strength, modulus of elasticity, impact strength, thermal deformation resistance, etc.) for molding materials as those of thermosetting resins.

POLYETHYLENE TEREPHTHALATE RESIN COMPOSITION, MOLDED PRODUCT AND RESIN MODIFYING METHOD

CROSS REFERENCE TO RELATED APPLICATION

This is a continuation-in-part of application Ser. No. 09/027,364 filed Feb. 20, 1998, and the entire disclosure of this prior application is considered to be part of the disclosure of the accompanying application and is hereby incorporated by reference therein.

BACKGROUND OF THE INVENTION

1. Field of the Invention

The present invention relates to a polyethylene terephthalate resin molded product good in appearance, surface gloss, mechanical characteristics and light fastness, a polyethylene terephthalate resin composition enabling the production of said molded product, and a method for modifying a polyethylene terephthalate resin.

2. Description of the Prior Art

Being good in mechanical properties, gas-blocking property, chemical resistance, flavor-retaining property, transparency, hygienic property, etc., polyethylene terephthalate resins are widely used after processing into various parts, fibers, sheets, tubes, containers, etc.

For some applications, it is necessary to provide additional functions for polyethylene terephthalate resins by coloring. Polyethylene terephthalate resins are colored for light shading, decoration, color identification, improvement of light fastness of plastics, content protection or masking, and for other purposes; black colored molded products are industrially most common and important.

Traditionally, black coloring of polyethylene terephthalate resins has been achieved using black pigments represented by carbon black. For example, there have been various attempts to impart a black color to polyethylene terephthalate resins, including the multiple color dope dyed polyethylene terephthalate film described in Japanese Patent Unexamined Publication No. 40347/1974, prepared by mixing a polyethylene terephthalate resin containing carbon black added at the time of polymerization, with other pigments; the production method for dope dyed polyester pellets described in Japanese Patent Unexamined Publication No. 250034/1986, wherein dope dyed polyester pellets prepared by mixing polyethylene terephthalate with a pigment (e.g., carbon black) are produced after a masterbatch is prepared by mixing the polyester and the pigment in a molten state; the polyethylene terephthalate resin composition described in Japanese Patent Unexamined Publication No. 281070/1990, prepared by adding a spherical iron oxide of the hematite structure to a polyethylene terephthalate resin; and the black polyester coloring agent described in Japanese Patent Unexamined Publication No. 194825/1993, wherein carbon black is dispersed in a mixed resin of a polyethylene terephthalate resin and a polybutylene terephthalate resin.

Also, fiber-reinforced polyethylene terephthalate resins are used in electronic parts, automobile parts, electric appliance parts, etc., since they possess as excellent physical properties (mechanical strength, modulus of elasticity, impact strength, thermal deformation resistance, etc.) for molding materials as those of thermosetting resins.

Previous attempts to color fiber-reinforced polyethylene terephthalate resins include the polyester resin composition for molding described in Japanese Patent Unexamined Publication No. 117951/1990, comprising a polyethylene terephthalate having a specific viscosity of not less than 0.35, a reinforcing material, and carbon black; the composition for molding described in Japanese Patent Unexamined Publication No. 261462/1992, comprising a polyethylene terephthalate and glass fiber, as well as an aliphatic polyester, a metal salt of an ionic hydrocarbon copolymer, an antioxidant, a secondary amide, and carbon black as a coloring agent; and the polyethylene terephthalate resin composition reinforced with antistatic glass fiber described in Japanese Patent Unexamined Publication No. 53610/1996, comprising a glass-fiber-reinforced polyethylene terephthalate resin having a volume resistivity of not more than $1 \times 10^{10} \Omega \cdot cm$ and carbon black.

In recent years, there has been strong commercial demand for a polyethylene terephthalate resin composition possessing improved light fastness, since polyethylene terephthalate resin products have been widely used outdoors. Also, there has been strong demand for molded products of high precision in details for use in electrical appliance parts and automobile product parts.

When a polyethylene terephthalate resin is colored black using a black pigment (e.g., carbon black, phthalocyanine black), as in the prior art, the black pigment is not readily finely dispersed in the resin, even after long kneading, resulting in decreased physical properties and light fastness, in comparison with natural resins that do not contain a coloring agent. Also, when a glass-fiber-reinforced polyethylene terephthalate resin is colored black using a black pigment, fluidity of the glass-fiber-reinforced resin and surface gloss of the molded product are considerably reduced, and in some cases warp deformation due to thermal change increases during the molding process.

In view of the above problems in the prior art, the object of the present invention is to provide a polyethylene terephthalate resin molded product that is uniformly colored black and that is good in surface gloss, light fastness, mechanical characteristics and thermal dimensional stability, and a polyethylene terephthalate resin composition enabling the production of said molded product.

SUMMARY OF THE INVENTION

The present inventors found that a molded product of a polyethylene terephthalate resin composition colored with Nigrosine is excellent in all of appearance, surface gloss, mechanical characteristics and light fastness, and developed the present invention.

Accordingly, the polyethylene terephthalate resin composition of the present invention for accomplishing the above object is a polyethylene terephthalate resin composition comprising a polyethylene terephthalate resin and Nigrosine.

A polyethylene terephthalate resin, as defined herein, is understood to be a polymer having a large number of ethylene terephthalate repeat units in the molecular structure thereof, which polymer is obtained from an aromatic dicarboxylic acid (mainly terephthalic acid or an ester thereof) and a glycol (mainly ethylene glycol) as principal starting materials.

Also, the polyethylene terephthalate resin composition of the present invention may have a fibrous reinforcing material.

Any fibrous reinforcing material can be used as appropriate without limitation, as long as it can be contained in synthetic resins to reinforce them. Examples of useful fibrous reinforcing materials include glass fiber, carbon fiber and organic fibers (aramid, polyphenylene sulfide, nylon, polyester, liquid crystal polymer, etc.).

The polyethylene terephthalate resin molded product of the present invention comprises the above-described polyethylene terephthalate resin composition.

Next, the method of the present invention for modifying a polyethylene terephthalate resin comprises adding Nigrosine to the polyethylene terephthalate resin.

Molded products of the polyethylene terephthalate resin composition of the present invention (including the case wherein a fibrous reinforcing material is contained) are excellent in light fastness of nigrosine coloring and slow in discoloration speed; in addition, the discoloration change is unlikely to be noticed because the discoloration occurs within the range of the same hue. Furthermore, the change in surface gloss and surface shape due to irradiation of a large amount of light (light fastness test) is less significant in the case of nigrosine coloring than in the case of carbon black coloring; in molded products having a fibrous reinforcing material, in particular, the difference from carbon black coloring is wide.

Molded products of the polyethylene terephthalate resin composition of the present invention are equivalent or superior to molded products of natural resins containing no coloring agents in tensile yield strength, tensile breaking strength, elongation, bending strength, and bending elastic modulus, with almost no deterioration of their mechanical characteristics, although they are slightly inferior in Izod impact value. The molded product can elongate more than 200%, i.e. more than two times relative to a natural polyethylene terephthalate resin containing no coloring agents. When compared with molded products of polyethylene terephthalate resin compositions colored with carbon black, molded products of the polyethylene terephthalate resin composition of the present invention are superior in almost all mechanical characterstics; in particular, they show very marked differences from molded products of polyethylene terephthalate resin compositions colored with carbon black, which show almost no elongation and do not undergo the yielding phenomenon. Also, molded products of the polyethylene terephthalate resin composition of the present invention as having a fibrous reinforcing material are superior to molded products of resin compositions colored with carbon black, and having a fibrous reinforcing material, in almost all mechanical characteristics.

Additionally, the polyethylene terephthalate resin composition of the present invention (including the case wherein a fibrous reinforcing material is contained) provides molded products with almost no anisotrophy in strength, and with good thermal dimensional stability.

Because the nigrosine in the polyethylene terephthalate resin composition of the present invention (including the case wherein a fibrous reinforcing material is contained) is highly dispersible and soluble in polyethylene terephthalate resins, it is capable of rapidly and more uniformly blackening polyethylene terephthalate resins even by the dry color method, in comparison with the use of carbon black as the only coloring agent, enabling the easy obtainment of uniformly black molded products. This uniform coloring effect is especially marked in polyethylene terephthalate resin compositions containing a fibrous reinforcing material, in which coloring agents are very difficult to disperse due to the influence of the fibrous reinforcing material.

When the polyethylene terephthalate resin composition of the present invention (including the case wherein a fibrous reinforcing material is contained) is molded using a mold, the crystallization rate of the polyethylene terephthalate resin is well controlled, i.e. the crystallization rate is lower than that of a natural polyethylene terephthalate resin containing no coloring agents and that of a polyethylene terephthalate resin composition comprising a polyethylene terephthalate resin and carbon black, to ensure a uniform distribution of the polyethylene terephthalate resin composition throughout the inside of the mold. This enables precise molding, the molded product obtained is unlikely to have fine ruggedness on the surface thereof, and a molded product with good appearance and surface gloss is obtained.

Furthermore, because the polyethylene terephthalate resin composition of the present invention (including the case wherein a fibrous reinforcing material is contained) undergoes almost no fading or discoloration in nigrosine coloring even during hot melting, and it undergoes almost no reduction in fluidity during hot melting because of the containment of nigrosine, it is suited for the production of molded products by hot melting.

Also, because the polyethylene terephthalate resin composition of the present invention (including the case wherein a fibrous reinforcing material is contained), unlike counterpart compositions containing no coloring agents other than pigments such as carbon black, hardly undergo reduction in insulating property because of the containment of Nigrosine, it provides molded products with a good insulating property and is ideal as a material for parts for use in the electric, electronic and automobile fields, for example.

According to the method of the present invention for modifying a polyethylene terephthalate resin, the polyethylene terephthalate resin can be made to be capable of elongating more than natural resins by the addition of Nigrosine.

DETAILED DESCRIPTION OF THE INVENTION

The following description applies to both polyethylene terephthalate resin compositions with a fibrous reinforcing material and those without, unless the two cases are discriminated.

The polyethylene terephthalate resin for the present invention preferably has 60 mol % or more ethylene terephthalate repeat units. More preferably, it has 80 mol % or more ethylene terephthalate repeat units, and still more preferably 90 mol % or more ethylene terephthalate repeat units.

The polyethylene terephthalate resin for the present invention may contain aromatic dicarboxylic acids other than terephthalic acid, such as
isophthalic acid,
phthalic acid,
2,6-naphthalenedicarboxylic acid,
1,4-naphthalenedicarboxylic acid,
adipic acid,
sebacic acid,
4,4'-diphenyletherdicarboxylic acid,
cyclohexanedicarboxylic acid,
hydroxycarboxylic acids (e.g., p-hydroxybenzoic acid, p-hydroxyethoxybenzoic acid), etc.
as copolymer components, and may also contain glycols other than ethylene glycol, such as
diethylene glycol,
propylene glycol,
1,4-butanediol,
1,3-propanediol, 1,4-cyclohexanedimethanol,
polyalkylene oxide,
neopentylglycol, etc.
as copolymer components.

Also, the polyethylene terephthalate resin for the present invention may be a polymer alloy of a polyethylene terephthalate that may contain the above-mentioned aromatic dicarboxylic acids other than terephthalic acid and/or glycols other than ethylene glycol as copolymer components, and another synthetic resin. Examples of such polymer alloys include
polyethylene terephthalate/polycarbonate alloy,
polyethylene terephthalate/polyamide alloy,
polyethylene terephthalate/ABS alloy,
polyethylene terephthalate/polypropylene alloy,
polyethylene terephthalate/polyphenylene ether alloy,
polyethylene terephthalate/polybutylene terephthalate alloy, etc.

Nigrosine is a black azine condensed mixture as described in the COLOR INDEX as C.I. SOLVENT BLACK 5 or C.I. SOLVENT BLACK 7. Its synthesis can be achieved by, for example, oxidizing and dehydrate-condensing aniline, aniline hydrochloride and nitrobenzene in the presence of iron chloride at a reaction temperature of 160 to 180° C. Nigrosine is produced as a mixture of various different compounds, depending on reaction conditions, charged materials and charging ratio, and is assumed to be a mixture of various azine compounds such as triphenazineoxazine and phenazineazine. Commercial Nigrosine products are exemplified by SPIRIT BLACK SB, SPIRIT BLACK SSBB and SPIRIT BLACK AB (all categorized under C.I. SOLVENT BLACK 5); and NIGROSINE BASE SA, NIGROSINE BASE SAP, NIGROSINE BASE EE, NIGROSINE BASE EX and NIGROSINE BASE EX-BP (all categorized under C.I. SOLVENT BLACK 7) [all trade names for Nigrosine products of Orient Chemical Industries Ltd.].

The Nigrosine content in the polyethylene terephthalate resin composition of the present invention may be 0.01 to 10% by weight relative to the polyethylene terephthalate resin in the case of ordinary resin coloring (for low-color-density molded products). This content is preferably 0.01 to 5% by weight, and in view of mechanical properties, it is more preferably 0.01 to 3% by weight. In the case of masterbatches (for high-color-density molded products), the Nigrosine content may be 20 to 50% by weight relative to the polyethylene terephthalate resin, It is preferably 20 to 35% by weight.

The polyethylene terephthalate resin composition of the present invention may incorporate appropriate amounts of various fibrous reinforcing materials according to use and purpose. Such fibrous reinforcing materials may be any ones without limitation, as long as they can be used to reinforce conventional synthetic resins. Examples of useful fibrous reinforcing materials include glass fiber, carbon fiber and organic fibers (aramid, polyphenylene sulfide, nylon, polyester, liquid crystal polymer, etc.), with preference given to glass fiber.

When glass fiber is used, it may be of alkali-containing glass, low-alkali glass, alkali-free glass, or the like, with preference given to E glass and T glass. The glass fiber used preferably has a fiber length of 2 to 15 mm and a fiber diameter of 1 to 20 $\mu$m. The glass fiber is not subject to limitation as to form. For example, the glass fiber may be in the form of roving, milled fiber, chopped strand, or the like. Such forms of glass fiber may be used singly, or in combination of two or more kinds.

The amount of fibrous reinforcing material used, such as glass fiber, may be, for example, about 5 to 120% by weight relative to the polyethylene terephthalate resin. This amount is preferably 10 to 60% by weight, more preferably 20 to 50% by weight. Amounts lower than 5% by weight tend to cause no satisfactory reinforcing effect of glass fiber etc., and those exceeding 120% by weight tend to cause moldability decreases.

The above-described glass fiber may be surface treated with a coupling agent to increase its affinity for polyethylene terephthalate resin. Examples of useful coupling agents include silane coupling agents such as aminosilane, epoxysilane, vinylsilane and methacrylsilane, and titanate coupling agent, aluminum coupling agent, chromium coupling agent, zirconium coupling agent and borane coupling agent. Of these coupling agents, silane coupling agent and titanate coupling agent are preferred. Any method, without limitation, can be used in treating the surface of glass fiber with such a coupling agent; useful methods include the aqueous solution method, the organic solvent method and the spray method, all of which have traditionally been used commonly. Although the amount of coupling agent used is not subject to limitation, it is normally used so that its total amount is 0.1 to 1.5% by weight relative to the glass fiber.

The polyethylene terephthalate resin composition of the present invention may contain various additives as necessary. Examples of such additives include coloring auxiliaries, dispersing agents, fillers, stabilizers, plasticizers, ultraviolet absorbents, antioxidants, antistatic agents, lubricants, release agents, crystallization promoters, crystal nucleating agents, flame retardants and elastomers for improved impact resistance.

As coloring auxiliaries, small amounts of inorganic pigments (e.g., carbon black, iron oxide), organic pigments (e.g., aniline black, phthalocyanine black, perinone black) or organic dyes (e.g., chromium complex monoazo dyes, cobalt complex monoazo dyes) may be incorporated as necessary to enhance coloring power, to adjust color tone, or to accomplish other purposes, as long as the accomplishment of the object of the present invention is not interfered with.

Examples of dispersing agents include stearates such as calcium stearate and sodium stearate; polyoxyethylene alkyl ethers such as polyoxyethylene lauryl ether and polyoxyethylene stearyl ether; and alkylnaphthalenesulfonates such as sodium alkylnaphthalenesulfonates.

Examples of modifiers include silicon compounds such as amino-modified silicone oil and alkyl-modified silicone oil.

Examples of ultraviolet absorbents and light stabilizers include benzotriazole compounds, benzophenone compounds, salicylate compounds, cyanoacrylate compounds, benzoate compounds, oxalide compounds, hindered amine compounds and niccolates.

Examples of antioxidants include phenol compounds, phosphorus compounds, sulfur compounds and thioether compounds.

Examples of antibacterial/antifungal agents include 2-(4'-thiazolyl)-benzimidazole, 10,10'-oxybisphenoxarsine, N-(fluorodichloromethylthio)phthalimide and bis(2-pyridylthio-1-oxide)zinc.

Examples of flame retardants include halogen—containing compounds such as tetrabromobisphenol A derivatives, hexabromodiphenyl ether and tetrabromophthalic anhydride; phosphorus—containing compounds such as triphenyl phosphate, triphenyl phosphite, red phosphorus and ammonium polyphosphate; nitrogen—containing compounds such as urea and guanidine; silicon—containing compounds such as silicone oil, organic silane and aluminum silicate; and antimony compounds such as antimony trioxide and antimony phosphate.

Examples of lubricants include esters of aliphatic alcohols and partial esters of polyhydric alcohols and partial ethers of polyhydric alcohols.

Examples of inorganic fillers include glass flake, glass beads, silica, quartz, amorphous silicic acid, talc, magnesium carbonate, calcium carbonate, alumina, montmorillonite, metal powder, kaolin, calcium silicate, mica and :wollastonite.

The polyethylene terephthalate resin composition of the present invention can be prepared by an optionally chosen method. For example, it can be prepared by mixing in an appropriate mixer a polyethylene terephthalate resin, in a pellet or powder form, pulverized Nigrosine, a fibrous reinforcing material in the case of fiber reinforcement, and, if necessary, various additives in appropriate amounts. Typically, these formula components are preferably dispersed as uniformly as possible. For this purpose, there can be used, for example, those methods in which two or more of the formula components are thoroughly mixed using a mechanical mixer, after which they are mixed with the other component(s) (e.g., method in which Nigrosine and a polyethylene terephthalate resin are thoroughly mixed, after which they are mixed with the other components including glass fiber), and those methods in which a dry-blended composition is kneaded in a molten state using a heated extruder to obtain a uniform composition. The resin composition of the present invention can also be prepared by adding Nigrosine to a monomer containing an appropriate polymerization catalyst, and conducting polymerization to yield the desired polyethylene terephthalate resin.

The polyethylene terephthalate resin composition of the present invention can be molded by any molding methods in common use, including injection molding, extrusion molding, compression molding, foaming molding, blow molding, vacuum molding, injection blow molding, rotary molding, calender molding and solution casting. It may also be kneaded in a molten state and extruded into needles using an extruder, and cut to desired length to yield granules.

A masterbatch (high-density molded product) of the polyethylene terephthalate resin composition of the present invention can, for example, be obtained by mixing the polyethylene terephthalate resin as the masterbatch base, in a powder or pellet form, and Nigrosine in a tumbler, a super mixer, or the like, pelletizing or coarsely granulating the mixture by the hot melt method using an extruder, a batch kneader, a roll kneader, or the like. A masterbatch can also be obtained by adding a coloring agent to a polyethylene terephthalate resin for masterbatch remaining in solution after synthesis, then removing the solvent.

More specifically, a polyethylene terephthalate resin composition containing a fibrous reinforcing material can, for example, be prepared by mixing a polyethylene terephthalate resin and Nigrosine, then kneading in a molten state this mixture and a fibrous reinforcing material such as glass fiber using an ordinary extruder, or by kneading in a molten state a polyethylene terephthalate resin and a fibrous reinforcing material such as glass fiber using an ordinary extruder, while Nigrosine is fed using a constant-rate feeder, or by preparing a polyethylene terephthalate resin masterbatch containing a high concentration of Nigrosine, mixing this masterbatch, a polyethylene terephthalate resin and a fibrous reinforcing material such as glass fiber, and kneading in a molten state this mixture using an ordinary extruder.

EXAMPLES

The present invention is hereinafter described in more detail by means of the following examples, which are not to be construed as limitative.

Examples 1 through 4 and Comparative Examples 1 and 2 pertain to polyethylene terephthalate resin compositions containing no fibrous reinforcing materials and polyethylene terephthalate resin molded products not reinforced with fiber.

Example 1

Polyethylene terephthalate resin (produced by Unitica Corporation, trade name: ES2040) . . . 500 g Nigrosine (produced by Orient Chemical Industries Ltd., trade name: NIGROSINE BASE EX) . . . 0.25 g The above ingredients were placed in a stainless steel tumbler and stirred and mixed for 1 hour.

The resulting mixture was kneaded in a molten state at 260° C. ° C. using a vent-type extruder (produced by Enpla Sangyo, trade name: E30SV), after which it was treated by a conventional method to prepare colored pellets, which were then placed in a drying machine and dried at 80° C. for 3 hours.

The dried pellets were injection molded at 260° C. by an ordinary method using an injection molding machine (produced by Kawaguchi Tekko, trade name: KM50-C) to yield a uniformly black test piece [48×86×3 (mm)] with good appearance and surface gloss, high surface smoothness, and high molding precision in the mold.

For this test piece, the result of visual assessment of appearance and that of determination of reflection density in light fastness test are shown in Table 2 below.

Also, by treating and molding 500 g of the above-described polyethylene terephthalate resin and 5 g of the above-described Nigrosine in the same manner as above, a physical property test piece conforming to the respective testing specifications for Izod impact value, tensile yield strength, tensile breaking strength, elongation, bending strength and bending elastic modulus was obtained.

For such test pieces, the results of determination of Izod impact value, tensile yield strength, tensile breaking strength, elongation, bending strength and bending elastic modulus are shown in Table 3 below.

The testing methods, evaluation criteria and determination methods used in Examples and Comparative Examples in this Specification are as follows:

(1) Appearance Test

The state of coloring (coloring agent dispersion and compatibility), surface gloss and surface shape were evaluated by visual inspection of the test piece under standard light C (JIS L0804).

1) Assessment Criteria for Coloring
◎: Uniformly and distinctly colored.
○: Uniformly colored.
Δ: Partially ununiformly colored.
X: Generally ununiformly colored.

2) Assessment Criteria for Surface Gloss
○: Glossy on surface.
Δ: Partially glossless on surface.
X: Glossless on surface.

3) Assessment Criteria for Surface Shape
○: Smooth surface with desired dimensions without distortion.
Δ: Partially distorted surface.
X: Fine surface ruggedness with distortion.

(2) Light Fastness Test

Using the Sunshine xenon long-life weather meter (produced by Shimadzu Corporation, trade name: XW-1200A), the test piece was exposed to light for 200, 400, 600 and 800 hours in a cycle of the 006 test conditions (phases 1 and 2 repeated under the conditions shown below).

| Light fastness test conditions with Sunshine xenon long - life weather meter | | |
|---|---|---|
| [Setting item] | [Phase 1] | [Phase 2] |
| Irradiance (Wm/2) (E) | 70 | 70 |
| Black standard temperature (° C.) | 63 | — |
| Rainfall test | No | Yes |
| Humidity (%) | 60 | — |
| Time (min) | 120 | 18 |

The reflection densities (OD values) of a pre-irradiation test piece (reference) and each post-irradiation test piece were determined using a transmission/reflection densitometer (produced by Macbeth, trade name: TR-927).

In general, test pieces having higher reflection densities (OD values) are judged to have higher surface smoothness and more surface gloss, and those showing greater OD value reduction over exposure time judged to have undergone more discoloration and fading.

(3) Determination of Izod Impact Value

In accordance with the Izod impact value test specifications (JIS K7110 for resin molded products not reinforced with fiber; JIS K7062 for resin molded products reinforced with fiber), the Izod impact value of the test piece was determined using an Izod impact value tester (produced by Toyo Seiki, trade name: Universal Impact Tester B-122403800).

Izod impact value: Quotient obtained by dividing the energy absorbed in the test piece upon its destruction by the original cross-sectional area at the test piece's notch.

(4) Determination of Tensile Yield Strength, Tensile Breaking Strength and Elongation In accordance with the test specifications for tensile strength (JIS K7113 for resin molded products not reinforced with fiber; JIS K7054 for resin molded products reinforced with fiber), the tensile yield strength, tensile breaking strength and elongation of the test piece were determined using a tensile strength tester (produced by Shimadzu Corporation, trade name: AUTOGRAPH DSS-5000).

Tensile yield strength: Tensile stress obtained on the first point on the load-elongation (distortion) curve on, which elongation begins to increase without load increase.

Tensile breaking strength: Tensile stress obtained at the moment of test piece breakage.

Elongation: Elongation value obtained at tensile breakage.

(5) Determination of Bending Strength and Bending Elastic Modulus

In accordance with the bending test specifications (JIS K7203 for resin molded products not reinforced with fiber; JIS K7055 for resin molded products reinforced with fiber), the bending strength and bending elastic modulus of the test piece were determined using a bending tester (produced by Shimadzu Corporation, trade name: AUTOGRAPH AG-50KNE).

Bending strength: Maximum bending stress obtained when a concentrated load is exerted from above on the center of the test piece supported at two points on the respective ends.

Bending elastic modulus: Deformation resistance of the test piece against bending stress on the linear portion of the load-deflection curve below the elasticity limit.

Examples 2 and 3

Uniformly black test pieces [48×86×3 (mm)] with good appearance and surface gloss, high surface smoothness, and high molding precision relative to the mold were obtained by treatment and injection molding in the same manner as in Example 1, except that the Nigrosine of Example 1 (produced by Orient Chemical Industries Ltd., trade name: NIGROSINE BASE EX) was replaced with the respective Nigrosines shown in Table 1 below.

TABLE 1

| | Trade name for Nigrosine |
|---|---|
| Example 2 | NIGROSINE BASE SAP (produced by Orient Chemical Industries Ltd.) |
| Example 3 | SPIRIT BLACK SB (produced by Orient Chemical Industries Ltd.) |

For these test pieces, the results of visual assessment of appearance and those of determination of reflection density in the light fastness test are shown in Table 2 below.

Also, by treating and molding 500 g of the polyethylene terephthalate resin of Example 1 and 5 g of each Nigrosine shown in Table 1 in the same manner as above, physical property test pieces conforming to the respective testing specifications for Izod impact value, tensile yield strength, tensile breaking strength, elongation, bending strength and bending elastic modulus were obtained.

For these test pieces, the results of determination of Izod impact value, tensile yield strength, tensile breaking strength, elongation, bending strength and bending elastic modulus are shown in Table 3 below.

Next, Example 4 pertains to the production of a masterbatch (high-density molded product) and subsequent dilution molding of the masterbatch with a polyethylene terephthalate resin.

Example 4

Polyethylene terephthalate resin (produced by Unitica Corporation, trade name: ES2040) . . . 500 g Nigrosine (produced by Orient Chemical Industries Ltd., trade name: NIGROSINE BASE SAP) . . . 125 g The above ingredients were placed in a stainless steel tumbler and stirred and mixed for 1 hour.

The resulting mixture was kneaded in a molten state at 260° C. using a twin-screw extruder (produced by Ikegai Corporation, trade name: PCM-30), while the gas generated was inhaled, to yield black pellets. These pellets were dried under reduced pressure at 120° C. for 1 day to yield a masterbatch having a coloring agent concentration of 25% by weight.

To dilute this masterbatch 100 fold (ratio by weight) in polyethylene terephthalate resin, this masterbatch and a necessary amount of the polyethylene terephthalate resin (produced by Unitica Corporation, trade name: ES2040) were placed in a stainless steel tumbler and stirred and mixed for 1 hour.

The resulting mixture was then mixed in a molten state at 260° C. using a vent-type extruder (produced by Enpla Sangyo, trade name: E30SV), after which it was treated by a conventional method to prepare colored pellets, which were then placed in a drying machine and dried at 80° C. for 3 hours.

The dried pellets were injection molded at 260° C. by an ordinary method using an injection molding machine (produced by Kawaguchi Tekko, trade name: KM50-C) to yield a uniformly black test piece [48×86×3 (mm)] with good appearance and surface gloss.

Comparative Example 1

Polyethylene terephthalate resin (produced by Unitica Corporation, trade name: ES2040) . . . 500 g Carbon black (produced by Mitsubishi Chemical Corporation, trade name: 960) . . . 0.25 g Using the above ingredients, colored pellets were prepared and injection molded in the same manner as in Example 1 to yield a black test piece [48×86×3 (mm)] with poor surface gloss and significant coloring unevenness due to uniform coloring agent dispersion.

For this test piece, the results of visual assessment of appearance and those of determination of reflection density in the light fastness test are shown in Table 2 below.

Also, by treating and molding 500 g of the above-described polyethylene terephthalate resin and 5 g of the above-described carbon black in the same manner as above, a physical property test piece conforming to the respective testing specifications for Izod impact value, tensile yield strength, tensile breaking strength, elongation, bending strength and bending elastic modulus was obtained.

For this test piece, the results of determination of Izod impact value, tensile yield strength, tensile breaking strength, elongation, bending strength and bending elastic modulus are shown in Table 3 below.

Comparative Example 2

Polyethylene terephthalate resin (produced by Unitica Corporation, trade name: ES2040) . . . 500 g Masterbatch containing 25% by weight carbon black (produced by Koshigaya Chemical, trade name: CARBON MB) . . . 1 g Using the above ingredients, colored pellets were prepared and injection molded in the same manner as in Example 1 to yield a black test piece [48×86×3 (mm)] with poor surface gloss and bad coloring agent dispersion.

For this test piece, the results of determination of appearance, surface properties and light fastness are shown in Table 2 below.

Also, by treating and molding 500 g of the above-described polyethylene terephthalate resin and 20 g of the above-described masterbatch containing 25% by weight carbon black in the same manner as above, a physical property test piece conforming to the respective testing specifications for Izod impact value, tensile yield strength, tensile breaking strength, elongation, bending strength and bending elastic modulus was obtained.

For this test piece, the results of determination of Izod impact value, tensile yield strength, tensile breaking strength, elongation, bending strength and bending elastic modulus are shown in Table 3 below.

TABLE 2

|  | Appearance test | | | Light fastness test (OD values) | | | | |
| --- | --- | --- | --- | --- | --- | --- | --- | --- |
|  | Coloring evenness | Surface gloss | Surface shape | Reference | 200 hours | 400 hours | 600 hours | 800 hours |
| Example 1 | ⊚ | ○ | ○ | 2.87 | 2.87 | 2.75 | 2.71 | 2.67 |
| Example 2 | ⊚ | ○ | ○ | 2.86 | 2.83 | 2.81 | 2.70 | 2.43 |
| Example 3 | ⊚ | ○ | ○ | 2.84 | 2.84 | 2.74 | 2.70 | 2.70 |
| Comparative Example 1 | x | Δ | Δ | 2.15 | 2.11 | 2.06 | 1.86 | 1.74 |
| Comparative Example 2 | x | Δ | Δ | 2.22 | 2.20 | 2.19 | 2.10 | 2.08 |

TABLE 3

|  | Izod impact value (KJ/m$^2$) | Tensile yield strength (N/mm$^2$) | Tensile breaking strength (N/mm$^2$) | Elongation (%) | Bending strength (N/mm$^2$) | Bending elastic modulus (N/mm$^2$) |
| --- | --- | --- | --- | --- | --- | --- |
| Example 1 | 3.42 | 55.48 | 38.43 | 272 | 76.66 | 2202.17 |
| Example 2 | 3.46 | 55.22 | 37.82 | 292 | 78.24 | 2213.08 |
| Example 3 | 3.38 | 53.89 | 42.56 | 278 | 76.42 | 2191.50 |
| Comparative Example 1 | 3.25 | No yield | 51.58 | 6 | 74.39 | 2002.38 |
| Comparative Example 2 | 3.26 | No yield | 54.87 | 15 | 74.42 | 2014.77 |
| Natural resin | 4.41 | 53.17 | 23.77 | 120 | 76.52 | 2190.88 |

The test pieces of Examples 1 through 3 showed tensile breakage after tensile yield because of good elongation. On the other hand, the test pieces of Comparative Examples 1 and 2 showed almost no elongation and were broken during the tensile yield strength determination so that their tensile yield strength could not be determined.

Examples 5 through 8 and Comparative Examples 3 and 4 pertain to polyethylene terephthalate resin compositions having a fibrous reinforcing material and fiber-reinforced polyethylene terephthalate resin molded products.

Example 5

Glass fiber-reinforced polyethylene terephthalate resin [fiber-reinforced polyethylene terephthalate resin with a mixing ratio by weight of polyethylene terephthalate resin-:glass fiber=100:30 (produced by du Pont, trade name: RYNITE) . . . 500 g Nigrosine (produced by Orient Chemical Industries Ltd., trade name: NIGROSINE BASE EX) . . . 0.25 g The above ingredients were placed in a stainless steel tumbler and stirred and mixed for 1 hour.

The resulting mixture was kneaded in a molten state at 270° C. using a vent-type extruder (produced by Enpla Sangyo, trade name: E30SV), after which it was treated by a conventional method to prepare colored pellets, which were then placed in a drying machine and dried at 80° C. for 3 hours.

The dried pellets were injection molded at 270° C. by an ordinary method using an injection molding machine (produced by Kawaguchi Tekko, trade name: KM50-C) to yield a uniformly black test piece [48×86×3 (mm)] with good appearance and surface gloss, high surface smoothness, and high molding precision relative to the mold.

For this test piece, the results of visual assessment of appearance and those of determination of reflection density in the light fastness test are shown in Table 5 below.

Also, by treating and molding 500 g of the above-described glass-fiber-reinforced polyethylene terephthalate resin and 5 g of the above-described Nigrosine in the same manner as above, a physical property test piece conforming to the respective testing specifications for Izod impact value, tensile yield strength, tensile breaking strength, elongation, bending strength and bending elastic modulus was obtained.

For this test piece, the results of determination of Izod impact value, tensile breaking strength, bending strength and bending elastic modulus are shown in Table 6 below.

Examples 6 and 7

Uniformly black test pieces [48×86×3 (mm)] with good appearance and surface gloss, high surface smoothness, and high molding precision relative to the mold were obtained by treatment and injection molding in the same manner as in Example 5, except that the Nigrosine of Example 5 (produced by Orient Chemical Industries Ltd., trade name: NIGROSINE BASE EX) was replaced with the respective Nigrosines shown in Table 4 below.

TABLE 4

| | Trade name for Nigrosine |
|---|---|
| Example 6 | NIGROSINE BASE SAP (produced by Orient Chemical Industries Ltd.) |
| Example 7 | SPIRIT BLACK SB (produced by Orient Chemical Industries Ltd.) |

For these test pieces, the results of visual assessment of appearance and those of determination of reflection density in the light fastness test are shown in Table 5 below.

Also, by treating and molding 500 g of the above-described glass-fiber-reinforced polyethylene terephthalate resin and 5 g of each Nigrosine shown above in the same manner as above, physical property test pieces conforming to the respective testing specifications for Izod impact value, tensile yield strength, tensile breaking strength, elongation, bending strength and bending elastic modulus were obtained.

For these test pieces, the results of determination of Izod impact value, tensile breaking strength, bending strength and bending elastic modulus are shown in Table 6 below.

Next, Example 8 pertains to the production of a masterbatch (high-density molded product) and subsequent dilution molding of the masterbatch with a fiber-reinforced polyethylene terephthalate resin.

Example 8

Polyethylene terephthalate resin (produced by Unitica Corporation, trade name: ES2040) . . . 500 g Nigrosine (produced by Orient Chemical Industries Ltd., trade name: NIGROSINE BASE EX) . . . 167 g The above ingredients were placed in a stainless steel tumbler and stirred and mixed for 1 hour.

The resulting mixture was kneaded in a molten state at 270° C. using a twin-screw extruder (produced by Ikegai Corporation, trade name: PCM-30), while the gas generated was inhaled, to yield black pellets. These pellets were dried under reduced pressure at 120° C. for 1 day to yield a masterbatch having a coloring agent concentration of 25% by weight.

To dilute this masterbatch 100 fold (ratio by weight) in glass-fiber-reinforced polyethylene terephthalate resin, this masterbatch and a necessary amount of the glass-fiber-reinforced polyethylene terephthalate resin (produced by du Pont, trade name: RYNITE) were placed in a stainless steel tumbler and stirred and mixed for 1 hour.

The resulting mixture was then mixed in a molten state at 270° C. using a vent-type extruder (produced by Enpla Sangyo, trade name: E30SV), after which it was treated by a conventional method to prepare colored pellets, which were then placed in a drying machine and dried at 80° C. for 3 hours.

The dried pellets were injection molded at 270° C. by an ordinary method using an injection molding machine (produced by Kawaguchi Tekko, trade name: KM50-C) to yield a uniformly black test piece [48×86×3 (mm)] with good appearance and surface gloss.

Comparative Example 3

Glass fiber-reinforced polyethylene terephthalate resin (produced by du Pont, trade name: RYNITE) . . . 500 g Carbon black (produced by Mitsubishi Chemical Corporation, trade name: 960) . . . 0.25 g Using the above ingredients, colored pellets were prepared and injection molded in the same manner as in Example 5 to yield a black test piece [48×86×3 (mm)] with poor surface gloss due to glass fiber exposure on the surface, and significant coloring unevenness due to uniform coloring agent dispersion.

For this test piece, the results of visual assessment of appearance and those of determination of reflection density in the light fastness test are shown in Table 5 below.

Also, by treating and molding 500 g of the above-described glass-fiber-reinforced polyethylene terephthalate resin and 5 g of the above-described carbon black in the same manner as above, a physical property test piece conforming to the respective testing specifications for Izod impact value, tensile yield strength, tensile breaking strength, elongation, bending strength and bending elastic modulus was obtained.

For this test piece, the results of determination of Izod impact value, tensile breaking strength, bending strength and bending elastic modulus are shown in Table 6 below.

Comparative Example 4

Glass fiber-reinforced polyethylene terephthalate resin (produced by du Pont, trade name: RYNITE) . . . 500 g Masterbatch containing 25% by weight carbon black (produced by Koshigaya Chemical, trade name: CARBON MB) . . . 1 g Using the above ingredients, colored pellets were prepared and injection molded in the same manner as in Example 5 to yield a black test piece [48×86×3 (mm)] with poor surface gloss due to glass fiber exposure on the surface, and bad coloring agent dispersion.

For this test piece, the results of visual assessment of appearance and those of determination of reflection density in the light fastness test are shown in Table 5 below.

Also, by treating and molding 500 g of the above-described glass-fiber-reinforced polyethylene terephthalate resin and 20 g of the above-described masterbatch containing 25% by weight carbon black in the same manner as above, a physical property test piece conforming to the respective testing specifications for Izod impact value, tensile yield strength, tensile breaking strength, elongation, bending strength and bending elastic modulus was obtained.

For this test piece, the results of determination of Izod impact value, tensile breaking strength, bending strength and bending elastic modulus are shown in Table 6 below.

TABLE 5

|  | Appearance test | | | Light fastness test (OD values) | | | | |
| --- | --- | --- | --- | --- | --- | --- | --- | --- |
|  | Coloring evenness | Surface gloss | Surface shape | Reference | 200 hours | 400 hours | 600 hours | 800 hours |
| Example 5 | ⊚ | ○ | ○ | 1.58 | 0.92 | 0.88 | 0.84 | 0.64 |
| Example 6 | ⊚ | ○ | ○ | 1.63 | 0.97 | 0.89 | 0.83 | 0.63 |
| Example 7 | ⊚ | ○ | ○ | 1.58 | 0.97 | 0.87 | 0.82 | 0.68 |
| Comparative Example 3 | x | x | x | 1.53 | 0.90 | 0.87 | 0.72 | 0.58 |
| Comparative Example 4 | x | x | x | 1.55 | 0.82 | 0.89 | 0.75 | 0.61 |

TABLE 6

|  | Izod impact value (KJ/m$^2$) | Tensile breaking strength (N/mm$^2$) | Bending strength (N/mm$^2$) | Bending elastic modulus (N/mm$^2$) |
| --- | --- | --- | --- | --- |
| Example 5 | 3.01 | 88.76 | 121.58 | 797.44 |
| Example 6 | 2.99 | 88.10 | 118.22 | 786.23 |
| Example 7 | 2.99 | 90.12 | 124.23 | 809.61 |
| Comparative Example 3 | 2.67 | 78.23 | 115.60 | 765.14 |
| Comparative Example 4 | 2.71 | 74.56 | 118.72 | 773.43 |
| Natural resin | 4.22 | 91.50 | 137.15 | 815.48 |

It should be noted that the test pieces of Examples 5 through 8 and Comparative Examples 3 and 4 did not permit tensile yield strength determination and showed almost no elongation because of fiber reinforcement.

While specific embodiments of the invention have been shown and described in detail to illustrate the application of the principles of the invention, it will be understood that the invention may be embodied otherwise without departing from such principles.

What is claimed is:

1. Composition consisting essentially of a resin and nigrosine, wherein the resin consists essentially of a polyethylene terephthalate resin.

2. Composition of claim 1 wherein the crystallization rate thereof is lower than that of the corresponding natural polyethylene terephthalate resin containing no coloring agents.

3. Composition of claim 1 wherein the crystallization rate thereof is lower than that of the corresponding composition consisting essentially of the polyethylene terephthalate resin and carbon black.

4. Composition of claim 1 wherein the corresponding molded product thereof can elongate more than 200%.

5. Composition of claim 1 wherein the corresponding molded product thereof can elongate more than two times relative to the corresponding natural polyethylene terephthalate resin containing no coloring agents.

6. Composition of claim 1 which contains a fibrous reinforcing material.

7. Composition of claim 2 which contains a fibrous reinforcing material.

8. Composition of claim 3 which contains a fibrous reinforcing material.

9. Composition of claim 7 wherein the fibrous reinforcing material is glass fiber.

10. Composition of claim 7 wherein the fibrous reinforcing material content is about 10 to 120% by weight relative to the polyethylene terephthalate resin.

11. Composition of claim 2 wherein the ethylene terephthalate repeat unit content in the polyethylene terephthalate resin is not less than about 90 mol % relative to the polyethylene terephthalate resin.

12. Composition of claim 4 wherein the ethylene terephthalate repeat unit content in the polyethylene terephthalate resin is not less than about 90 mol % relative to the polyethylene terephthalate resin.

13. Composition of claim 7 wherein the ethylene terephthalate repeat unit content in the polyethylene terephthalate resin is not less than about 90 mol % relative to the polyethylene terephthalate resin.

14. Composition of claim 2 wherein the nigrosine content is about 0.01 to 10% by weight relative to the polyethylene terephthalate resin.

15. Composition of claim 4 wherein the nigrosine content is about 0.01 to 10% by weight relative to the polyethylene terephthalate resin.

16. Composition of claim 7 wherein the nigrosine content is about 0.01 to 10% by weight relative to the polyethylene terephthalate resin.

17. Molded product consisting essentially of the composition of claim 1.

18. Molded product of claim 17 which can elongate more than 200%.

19. Molded product of claim 17 which can elongate more than two times relative to the corresponding natural polyethylene terephthalate resin molded product containing no coloring agents.

20. Method for modifying a starting resin consisting essentially of a polyethylene terephthalate resin to a modified resin wherein the crystallization rate thereof is lower than that of the corresponding natural polyethylene terephthalate resin containing no coloring agents, which consists essentially of adding nigrosine to the starting polyethylene terephthalate resin.

21. Method for modifying a starting resin consisting of a polyethylene terephthalate resin to a modified resin wherein the crystallization rate thereof is lower than that of the corresponding composition consisting essentially of the polyethylene terephthalate resin and carbon black, which consists essentially of adding nigrosine to the starting polyethylene terephthalate resin.

22. Method of claim 20 wherein the polyethylene terephthalate resin contains a fibrous reinforcing material.

23. Method of claim 21 wherein the polyethylene terephthalate resin contains a fibrous reinforcing material.

24. Method of claim 20 wherein the nigrosine content is about 0.01 to 10% by weight relative to the polyethylene terephthalate resin.

25. Method of claim 22 wherein the nigrosine content is about 0.01 to 10% by weight relative to the polyethylene terephthalate resin.

26. Method for modifying a starting resin consisting essentially of a polyethylene terephthalate resin to a modified resin wherein the corresponding molded product thereof can elongate more than 200%, which consists essentially of adding nigrosine to the starting polyethylene terephthalate resin.

27. Method for modifying a starting resin consisting essentially of a polyethylene terephthalate resin to a modified resin wherein the corresponding molded product thereof can elongate more than two times relative to the corresponding natural polyethylene terephthalate resin containing no coloring agents, which consists essentially of adding nigrosine to the starting polyethylene terephthalate resin.

28. Method of claim 26 wherein the nigrosine content is about 0.01 to 10% by weight relative to the polyethylene terephthalate resin.

29. Method of claim 27 wherein the nigrosine content is about 0.01 to 10% by weight relative to the polyethylene terephthalate resin.

30. Composition consisting essentially of a resin and nigrosine, wherein the resin consists essentially of a polyethylene terephthalate resin, the nigrosine is present in an amount of about 0.01 to 10% by weight relative to the polyethylene terephthalate resin, and the composition has a crystallization rate upon molding which is lower than that of the corresponding natural polyethylene terephthalate resin containing no coloring agents and which is also lower than that of the corresponding composition consisting essentially of the polyethylene terephthalate resin and carbon black.

31. Composition of claim 30 wherein the composition is capable of forming a molded product that can elongate more than 200% and also more than two times relative to the corresponding natural polyethylene terephthalate resin containing no coloring agents.

32. Composition consisting essentially of a resin and nigrosine, and optionally a fibrous reinforcing material, wherein the resin consists essentially of a polyethylene terephthalate resin, the nigrosine content is about 0.01 to 10% by weight relative to said resin, and the optional fibrous reinforcing material content, where present, is about 5 to 120% by weight relative to said resin.

\* \* \* \* \*